(12) United States Patent
Zhu

(10) Patent No.: US 9,109,126 B2
(45) Date of Patent: Aug. 18, 2015

(54) INK COMPOSITIONS COMPRISING COLORANT PARTICLES CONTAINING POLYMERIC PARTICLES

(71) Applicant: Jiandong Zhu, Aurora, IL (US)

(72) Inventor: Jiandong Zhu, Aurora, IL (US)

(73) Assignee: SANFORD, L.P., Downers Grove, IL (US)

( * ) Notice: Subject to any disclaimer, the term of this patent is extended or adjusted under 35 U.S.C. 154(b) by 126 days.

(21) Appl. No.: 13/947,574

(22) Filed: Jul. 22, 2013

(65) Prior Publication Data

US 2015/0024133 A1 Jan. 22, 2015

(51) Int. Cl.
| | |
|---|---|
| *C09D 11/17* | (2014.01) |
| *C08K 5/1535* | (2006.01) |
| *C08K 5/01* | (2006.01) |
| *C08K 3/22* | (2006.01) |
| *B43K 1/00* | (2006.01) |
| *C09D 11/037* | (2014.01) |

(52) U.S. Cl.
CPC ............... *C09D 11/17* (2013.01); *B43K 1/006* (2013.01); *C08K 3/22* (2013.01); *C08K 5/01* (2013.01); *C08K 5/1535* (2013.01); *C09D 11/037* (2013.01)

(58) Field of Classification Search
CPC .................................. C08K 3/22; B43K 1/006
USPC .................................................. 523/160, 161
See application file for complete search history.

(56) References Cited

U.S. PATENT DOCUMENTS

| | | | |
|---|---|---|---|
| 2,029,152 A | 1/1936 | Bonkowski | |
| 3,941,488 A | 3/1976 | Maxwell | |
| 3,985,455 A | 10/1976 | Wahlberg | |
| 4,032,491 A | 6/1977 | Schoenke | |
| 4,071,645 A | 1/1978 | Kahn | |
| 4,128,508 A | 12/1978 | Munden | |
| 4,148,591 A | 4/1979 | Tomura | |
| 4,156,657 A | 5/1979 | Lin | |
| 4,170,669 A | 10/1979 | Okada et al. | |
| 4,172,064 A | 10/1979 | Keeler | |
| 4,213,717 A | 7/1980 | Lin | |
| 4,227,930 A | 10/1980 | Lin | |
| 4,228,028 A | 10/1980 | Lin | |
| 4,243,417 A | 1/1981 | Grourke et al. | |
| 4,252,845 A | 2/1981 | Griffiths et al. | |
| 4,283,320 A | 8/1981 | Carroll et al. | |
| 4,349,639 A | 9/1982 | Muller | |
| 4,365,035 A | 12/1982 | Zabiak | |
| 4,509,875 A | 4/1985 | Shintani | |
| 4,557,618 A | 12/1985 | Iwata et al. | |
| 4,580,918 A | 4/1986 | Baker et al. | |
| 4,654,081 A | 3/1987 | Dalzell | |
| 4,822,417 A | 4/1989 | Kobayashi et al. | |
| 4,824,827 A | 4/1989 | Kelley et al. | |
| 4,865,479 A | 9/1989 | Doll | |
| 4,954,544 A | 9/1990 | Chandaria | |
| 5,026,189 A | 6/1991 | Keil | |
| 5,033,895 A | 7/1991 | Aida | |
| 5,037,475 A | 8/1991 | Chida et al. | |
| 5,139,572 A | 8/1992 | Kawashima | |
| 5,196,243 A | 3/1993 | Kawashima et al. | |
| 5,215,956 A | 6/1993 | Kawashima | |
| 5,232,494 A | 8/1993 | Miller | |
| 5,236,987 A | 8/1993 | Arendt | |
| 5,256,191 A | 10/1993 | Thompson et al. | |
| 5,326,388 A | 7/1994 | Miller et al. | |
| 5,338,123 A | 8/1994 | Obersteller et al. | |
| 5,370,471 A | 12/1994 | Kageyama et al. | |
| 5,418,013 A | 5/1995 | Detrick et al. | |
| 5,464,470 A | 11/1995 | Brachman et al. | |
| 5,478,382 A | 12/1995 | Miller et al. | |
| 5,486,228 A | 1/1996 | Miller et al. | |
| 5,489,331 A | 2/1996 | Miller et al. | |
| 5,492,558 A | 2/1996 | Miller et al. | |
| 5,498,282 A | 3/1996 | Miller et al. | |
| 5,498,285 A | 3/1996 | Hooykaas | |
| 5,499,881 A | 3/1996 | Chang | |
| 5,509,742 A | 4/1996 | Balzarini | |
| 5,649,999 A | 7/1997 | Wang | |
| 5,762,077 A | 6/1998 | Griffiths | |
| 5,872,162 A | 2/1999 | McHugh et al. | |
| 5,877,234 A | 3/1999 | Xu et al. | |
| 5,916,357 A | 6/1999 | Wang et al. | |
| 5,964,931 A | 10/1999 | Korper | |
| 5,964,932 A | 10/1999 | Ison et al. | |
| 5,997,891 A | 12/1999 | Fuerst et al. | |
| 6,149,721 A | 11/2000 | Wang et al. | |
| 6,179,501 B1 | 1/2001 | Fulop | |
| 6,221,432 B1 | 4/2001 | Wang et al. | |
| 6,276,853 B1 | 8/2001 | Breidenbach et al. | |
| 6,341,856 B1 | 1/2002 | Thompson et al. | |
| 6,357,943 B1 | 3/2002 | Kuang | |
| 6,412,998 B1 | 7/2002 | Ham | |
| 6,489,892 B2 | 12/2002 | Lawandy | |
| 6,491,464 B1 | 12/2002 | Young | |
| 6,554,516 B1 | 4/2003 | Christopher | |
| 6,561,713 B2 | 5/2003 | Sukhna et al. | |
| 6,770,689 B1 | 8/2004 | Yoshimura et al. | |
| 6,894,095 B2 | 5/2005 | Russo et al. | |
| 7,135,507 B2 | 11/2006 | Sexton | |
| 7,297,729 B2 * | 11/2007 | Sexton et al. ................ 523/161 |
| 7,364,614 B2 | 4/2008 | Kwan et al. | |
| 7,442,725 B2 | 10/2008 | Kwan et al. | |
| 7,981,210 B2 | 7/2011 | Kwan et al. | |
| 2002/0103283 A1 | 8/2002 | Elfring et al. | |
| 2002/0151648 A1 | 10/2002 | Fasano et al. | |

(Continued)

FOREIGN PATENT DOCUMENTS

| | | |
|---|---|---|
| CN | 1161911 | 10/1997 |
| EP | 0488980 | 6/1992 |

(Continued)

OTHER PUBLICATIONS

International Search Report and Written Opinion for PCT/US2014/046932 dated Oct. 22, 2014.

(Continued)

*Primary Examiner* — Doris Lee

(74) *Attorney, Agent, or Firm* — Marshall, Gerstein & Borun LLP

(57) ABSTRACT

Ink compositions for use in capillary-action markers are provided. More particularly, an ink composition includes a solvent, a colorant particle, and a resin component.

22 Claims, No Drawings

(56) References Cited

U.S. PATENT DOCUMENTS

| | | |
|---|---|---|
| 2003/0129015 A1 | 7/2003 | Sexton |
| 2004/0014875 A1 | 1/2004 | Russo et al. |
| 2005/0075419 A1 | 4/2005 | Kwan et al. |
| 2005/0143505 A1 | 6/2005 | Rosekelly et al. |
| 2010/0063186 A1 | 3/2010 | Onyenemezu |
| 2013/0171345 A1 | 7/2013 | Sexton |

FOREIGN PATENT DOCUMENTS

| | | |
|---|---|---|
| EP | 0549145 | 6/1993 |
| EP | 0 551 913 A1 | 7/1993 |
| EP | 0 860 483 A1 | 8/1998 |
| FR | 2749220 | 12/1997 |
| GB | 2 058 110 | 4/1981 |
| JP | 59124966 | 7/1984 |
| JP | 6049397 | 2/1994 |
| JP | 8134387 | 5/1996 |
| JP | 2000-313829 A | 11/2000 |
| JP | 2001/158196 | 6/2001 |
| WO | WO-92/07914 A1 | 5/1992 |
| WO | WO-96/23843 A1 | 8/1996 |
| WO | WO-03/085055 A1 | 10/2003 |
| WO | WO-2005/040290 A1 | 5/2005 |

OTHER PUBLICATIONS

Dianal Resins product brochure, Diana! America, Inc. (Aug. 2004).
DuPont™ Ti-Pure® R-104 Titanium Dioxide product brochure, DuPont (2013).
Maruya, Derwent Abstract 1987-017868 of JP Patent No. 61275369.
Resins and Performance Additives for Printing & Packaging Industries product brochure, BASF (2011).
Rubcouleur Acrylic Polymer Colored Beads, product brochure from Dainichiseika (publicly available before Jul. 22, 2013).
Spheromeres® CA and CS, product sheet, Microbeads® (2005).
Sylvares Terpene Phenolics, Arizona Chemical (downloaded from the Internet on Sep. 4, 2013).
TEGO® VariPlus—For Tough, Brilliant Finishes product brochure, Evonik Industries (2011).
U.S. Appl. No. 13/732,118, filed Dec. 31, 2012, Sexton et al., "Metallic Ink Composition and Writing Instrument Containing Same".

\* cited by examiner

INK COMPOSITIONS COMPRISING COLORANT PARTICLES CONTAINING POLYMERIC PARTICLES

BACKGROUND

1. Field of the Invention

The invention relates generally to ink compositions for use in capillary-action markers. More particularly, the invention relates to an ink composition, particularly a low viscosity ink composition, comprised of a solvent, a colorant particle, and a resin component.

2. Brief Description of Related Technology

Opaque markers (such as correction markers) are used to make opaque marks on paper, cardboard, glass, and other substrates. Correction markers, for example, are typically used to correct handwritten, typewritten, photocopied, and/or printed markings on one of the above substrates by forming an opaque mark capable of (1) effectively covering and concealing any undesirable markings previously made on the substrate, and (2) being written upon such that it can 'receive' new corrected markings.

Ink compositions for use in opaque markers (such as correction markers) typically include an opacifying pigment (e.g., titanium dioxide) dispersed in the ink composition. The opacifying pigment is typically present in sufficient quantity such that a written mark made with the ink composition on a substrate appears substantially or completely opaque. When the opaque marker is a correction marker, the opacifying pigment is present in sufficient quantity such that a corrective mark made with the ink composition on a substrate effectively conceals any undesirable markings previously made on the substrate.

Opacifying pigments (e.g., titanium dioxide) contained in ink compositions can settle over time because of the high density of the opacifying pigments relative to that of the carrier/solvent in the composition. Settling of the pigment particles occurs regardless of the particle size or shape because of the density differential between the pigment and the carrier/solvent, and ultimately results in little pigment being delivered to a substrate when a written mark is made with the ink composition. Consequently, correction markers generally include high viscosity ink compositions. As a result, corrective markers generally deliver their ink compositions using mechanisms such as a pin valve because delivery mechanisms associated with low viscosity ink compositions will inevitably become clogged.

Further, when porous substrates such as paper are used, small pigment particles tend to settle into the interstitial pores of the porous substrate after written markings are made on the substrate, thereby reducing the level of intensity and/or opacity of the written markings. Again, the foregoing effects can be mitigated by increasing the viscosity of the ink composition. For example, when conventional correction fluids having high viscosity and containing a fast drying solvent are applied to a porous substrate such as paper, some of the solvent is evaporated and some is absorbed by the porous substrate, thereby increasing the fluid viscosity at the substrate surface such that settling into the interstitial pores of the porous substrate is largely avoided. This approach, however, is not suitable for conventional capillary-action markers because such marker systems require very low viscosity inks (typically less than 40 centipoises).

Conventional capillary-action markers contain a fibrous reservoir and a nib in fluid communication therewith, and therefore do not allow ink compositions contained therein to be effectively mixed (once the marker is loaded with ink). Further, the marker's reservoir fibers and/or nib can undesirably filter any opacifying pigments contained therein and become clogged over time. Accordingly, over time, the marker is generally rendered incapable of making substantially opaque markings. Thus, it has been particularly difficult to achieve long-lasting opaque capillary-action markers containing conventional opacifying pigments because such marker systems require low viscosity inks, do not accommodate mixing, and often become clogged.

SUMMARY

The invention provides an ink composition comprising a solvent, a colorant particle dispersed in the solvent, and a resin component dissolved in the solvent, wherein the colorant particle comprises a polymer particle having an outer surface or a coating comprising a pigment or a dye, and the viscosity of the ink composition at 25° C. is less than about 40 centipoises (cps).

In a related aspect, the invention provides a marker comprising an ink reservoir and a porous nib, the ink reservoir containing an ink composition in accordance with the invention.

In another related aspect, the invention provides a method of making a written mark with an ink composition comprising the steps of providing a capillary-action marker comprising an ink reservoir and a porous nib, the ink reservoir containing an ink composition in accordance with the invention, and contacting the nib of the capillary-action marker to a substrate surface to make a written mark.

Further aspects of the invention may become apparent to those skilled in the art from a review of the following detailed description, taken in conjunction with the appended claims. While the invention is susceptible of embodiments in various forms, described hereinafter are specific embodiments of the invention with the understanding that the disclosure is illustrative, and is not intended to limit the invention to specific embodiments described herein.

DETAILED DESCRIPTION

The invention provides an ink composition comprising a solvent, a colorant particle dispersed in the solvent, and a resin component dissolved in the solvent, wherein the colorant particle comprises a polymer particle having an outer surface or a coating comprising a pigment or a dye, and the viscosity of the ink composition at 25° C. is less than about 40 centipoises (cps).

Surprisingly and unexpectedly, colorant particles comprising a polymer particle having an outer surface or a coating comprising a pigment or a dye settle more softly when present in an ink composition such that capillary-action markers containing same are not susceptible to clogging (particularly relative to markers containing conventional $TiO_2$ particles), even when the viscosity of the ink composition at 25° C. is less than about 40 cps, and thus can consistently, throughout the lifetime of the marker, provide written marks demonstrating a superior concealing (or decorative) effect. Further, when the ink compositions according to the invention are applied to a substrate, the colorant particles comprising a polymer particle are not susceptible to settling into the interstitial pores of a porous substrate after written markings are made on the substrate (at least relative to conventional $TiO_2$ particles). The foregoing effects are significant advantages relative to prior art low viscosity ink compositions containing conventional opaque pigments. Further, the colorant particles comprising a polymer particle having an outer surface or a coating comprising a pigment or a dye advantageously use significantly less pigment or dye (at least relative to conventional pigment colorant particles) to obtain a similar concealing (or decorative) effect.

The invention provides a marker (e.g., a capillary-action marker) comprising an ink reservoir and a porous nib, the ink reservoir containing an ink composition comprising a solvent, a colorant particle dispersed in the solvent, and a resin component dissolved in the solvent, wherein the colorant particle comprises a polymer particle having an outer surface or a coating comprising a pigment or a dye, and the viscosity of the ink composition at 25° C. is less than about 40 centipoises (cps).

The invention further provides a method of making a written mark with an ink composition in accordance with the invention, the method comprising: providing a capillary-action marker comprising an ink reservoir and a porous nib, the ink reservoir containing an ink composition comprising a solvent, a colorant particle dispersed in the solvent, and a resin component dissolved in the solvent, wherein the colorant particle comprises a polymer particle having an outer surface or a coating comprising a pigment or a dye, and the viscosity of the ink composition at 25° C. is less than about 40 centipoises (cps); and contacting the nib of the capillary-action marker to a substrate surface to make a written mark.

Ranges may be expressed herein as from "about" or "approximately" one particular value and/or to "about" or "approximately" another particular value. When such a range is expressed, another embodiment according to the invention includes from the one particular value and/or to the other particular value. Similarly, when particular values are expressed as approximations, but use of antecedents such as "about," "at least about," or "less than about," it will be understood that the particular value forms another embodiment.

Resins

To provide an ink composition suitable for delivery via a marking instrument (e.g., a capillary-action marker), a resin component is included in the ink composition. In general, resins can have a variety of functions in the ink, for example, resins may be incorporated for pigment wetting within the liquid matrix, resins may be incorporated so as to aid film formation as the ink transits from a liquid to a plastic state during solvent dry, and resins may be incorporated to generate the adhesion generally required to bond (or bind) pigments to various substrates.

In the ink compositions according to the invention, the resin component is typically included in an ink in a range of about 3 wt. % to about 30 wt. %, about 4 wt. % to about 28 wt. %, about 5 wt. % to about 25 wt. %, about 6 wt. % to about 25 wt. %, about 7 wt. % to about 25 wt. %, about 7 wt. % to about 20 wt. %, about 7 wt. % to about 15 wt. %, about 8 wt. % to about 12 wt. %, and/or about 10 wt. %, based on the total weight of the ink composition.

Suitable resins include resins having number average molecular weights (Mn) in a range of about 500 Daltons to more than 1 million Daltons, about 1000 Daltons to about 100,000 Daltons, and/or about 2000 Daltons to about 10,000 Daltons. The preferred number average molecular weight for a given resin will depend on various factors, including the desired adherence level and/or the desired final viscosity of the ink composition.

Suitable resins must show adequate solubility in the ink composition solvent(s). Exemplary resins include, but are not limited to, alcohol-soluble polymers or resins such as polyamide resins, acrylic resins, rosin resins, modified rosin resins, polymerized rosin resins, and phenolic resins; aliphatic hydrocarbon solvent-soluble polymers or resins such as acrylic resins, acrylic copolymers, rosin resins, modified rosin resins, polymerized rosin resins, terpene phenolic resins; water-soluble film-forming polymers or latexes, such as acrylic latexes and styrenated acrylic latexes; and mixtures thereof. Exemplary commercially available resins include, but are not limited to polyamide resins such as VERSAMID (BASF) and FLEX-REZ (Lawter), acrylic resins such as JONCRYL (BASF) and DIANAL MB and TB (Dianal America), polyol resins such as VARIPLUS SK (Evonik), ketone-aldehyde condensation resins such as VARIPLUS TC (Evonik), terpene phenolic resins such as SYLVARES TP (Arizona Chemicals), and latexes such as JONCRYL (BASF). Of course, these are merely representative of resins and do not encompass each example thereof.

Colorant Particles

A colorant particle is included in the ink compositions according to the invention, wherein the colorant particle comprises a polymer particle having an outer surface or a coating comprising a pigment or a dye. The colorant particle according to the invention advantageously demonstrates enhanced delivery as the ink composition of the invention is drawn to the nib from the fibrous ink reservoir via capillary-action and dispensed upon marking (e.g., making a written marking with the ink composition of the invention), at least relative to writing compositions comprising conventional opaque pigments.

The polymer particle can be a solid polymer particle, a porous polymer particle, or a hollow polymer particle. Solid polymer particles have a totally solid (i.e., non-porous) structure. Porous polymer particles include totally porous polymer particles (TPP) and superficially porous polymer particles (SPP). Superficially porous polymer particles include particles having a solid core structure contained within or at least partially surrounded by a porous outer shell. Hollow polymer particles include both porous polymeric shell particles and solid polymeric shell particles. Hollow polymer particles have a hollow core structure/interior surrounded by a porous or solid outer shell.

Porous polymer particles (including but not limited to hollow particles having a porous outer shell) advantageously have a lower density compared to otherwise similar solid polymer particles, and thus have reduced susceptibility to settling in low viscosity ink compositions. Further, porous polymer particles can demonstrate higher color intensity due to the presence of pigment particles and or dyes in the pores of the particles rather than only on the particle surface. Further still, porous polymer particles can demonstrate added opaqueness due to air voids present inside the beads after drying.

Particle porosity can be measured by various methods such as by the Brunauer-Emmett-Teller (BET) specific surface area method. Suitable porous particles generally have a BET specific surface area of about 1 $m^2/g$ to about 90 $m^2/g$, about 1 $m^2/g$ to about 80 $m^2/g$, about 1 $m^2/g$ to about 70 $m^2/g$, about 1 $m^2/g$ to about 60 $m^2/g$, about 1 $m^2/g$ to about 50 $m^2/g$, about 1 $m^2/g$ to about 40 $m^2/g$, about 1 $m^2/g$ to about 30 $m^2/g$, about 1 $m^2/g$ to about 20 $m^2/g$, about 2 $m^2/g$ to about 20 $m^2/g$, about 5 $m^2/g$ to about 20 $m^2/g$, about 5 $m^2/g$ to about 15 $m^2/g$, and/or about 7 $m^2/g$ to about 12 $m^2/g$. Typically, porous particles have an average pore size of about 1 nm to about 3000 nm, about 1 nm to about 2000 nm, about 1 nm to about 1500 nm, about 1 nm to about 1000 nm, about 1 nm to about 500 nm, about 1 nm to about 100 nm, about 1 nm to about 10 nm, about 10 nm to about 1000 nm, about 10 nm to about 500 nm, about 10 nm to about 100 nm, about 100 nm to about 1000 nm, and/or about 100 nm to about 500 nm.

Particle porosity generally leads to particles having increased surface roughness. Without intending to be bound by any particular theory, surface roughness is thought to enhance adhesion between the particles and the pigment or dye and/or between the particles and porous substrates by promoting mechanical interlocking. Surface roughness may also be present on non-porous particles and may be formed during bead production and/or through post-processing treatments such as plasma treatment or chemical etching.

Surface roughness can be assessed using various parameters. For example, surface roughness can be assessed by measuring the spacing between adjacent peaks on the particle surface. Generally, the particles have an average spacing between peaks of about 1 nm to about 1000 nm, about 1 nm to about 800 nm, about 1 nm to about 600 nm, about 1 nm to about 500 nm, about 1 nm to about 300 nm, and/or about 5 nm to about 300 nm. Further, surface roughness can be assessed by measuring the height (distance from peak to valley) of peaks on the particle surface. Generally, the particles have an average height of about 1 nm to about 1000 nm, about 1 nm to about 800 nm, about 1 nm to about 600 nm, about 1 nm to about 500 nm, about 1 nm to about 300 nm, and/or about 10 nm to about 300 nm.

Particles having a smooth surface also can be used.

The polymer particles are generally selected in conjunction with the solvent for the ink composition such that the polymer particles do not substantially swell (i.e., do not substantially increase in size) when contacted with the solvent. The polymer particles also are typically selected in conjunction with the solvent for the ink composition such that the polymer particles do not substantially contract (i.e., do not substantially decrease in size) when contacted with the solvent. By "substantially" is meant a 10% or less (e.g., 5% or less) variation in the size of the polymer particles when contacted with the solvent. The polymer particle can be crosslinked or non-crosslinked. Generally, crosslinked polymer particles have improved solvent resistance and/or mechanical toughness/stability relative to non-crosslinked polymer particles.

The polymer particles typically have an average particle diameter of about 1 micron to about 50 microns, about 2 microns to about 25 microns, about 3 microns to about 15 microns, about 4 microns to about 12 microns, about 5 microns to about 10 microns, and/or about 7 microns to about 9 microns.

Suitable polymers for the polymer particles include thermoplastic polymers and thermosetting polymers, including but not limited to, acrylic polymers and copolymers, poly (methyl methacrylate) (PMMA), polyamides, nylons, and alginates. Exemplary commercially available polymer particles include, but are not limited to PMMA particles such as SPHEREOMERS CA and CS (Microbeads) and CACHÉ CA (Microbeads) and polyamide particles such as ORGASOL (Arkema). Thermoplastic polymers can also be used for the polymeric particles.

Optionally, the polymer can be conjugated to a pigment or a dye. A colorant particle comprising a polymer-pigment conjugate or a polymer-dye conjugate can be obtained by conjugating (or grafting) a pigment or a dye to an already-formed particle, thereby obtaining polymer-pigment conjugates or polymer-dye conjugates on an outer surface of the particle (i.e., grafted particles). A colorant particle comprising a polymer-pigment conjugate or a polymer-dye conjugate can also be obtained by forming particles from the polymer-pigment conjugates or the polymer-dye conjugates, thereby obtaining polymer-pigment conjugates or polymer-dye conjugates on an outer surface of the particle and throughout the bulk material of the particle. Suitable colorant particles also include particles having a pigment or dye dispersed in a polymeric matrix, such as colorant particles comprising titanium dioxide pigment dispersed in an alginate matrix.

The colorant particles of the ink composition comprise a polymer particle having an outer surface or a coating comprising a pigment or a dye. The pigment or dye is generally present in an amount of about 0.1 wt. % to about 50 wt. % based on the total weight of the colorant particle, for example, about 0.1 wt. % to about 35 wt. %, about 1 wt. % to about 35 wt. %, about 5 wt. % to about 35 wt. %, about 10 wt. % to about 35 wt. %, about 15 wt. % to about 35 wt. %, about 20 wt. % to about 35 wt. %, about 25 wt. % to about 35 wt. %, about 30 wt. % to about 35 wt. %, about 1 wt. % to about 25 wt. %, about 1 wt. % to about 15 wt. %, and/or about 1 wt. % to about 10 wt. % based on the total weight of the colorant particle. The polymer particle is generally present in an amount of about 50 wt. % to about 99.9 wt. %, for example, about 65 wt. % to about 99.9 wt. %, about 65 wt. % to about 99 wt. %, about 65 wt. % to about 95 wt. %, about 65 wt. % to about 90 wt. %, about 65 wt. % to about 85 wt. %, about 65 wt. % to about 80 wt. %, about 65 wt. % to about 75 wt. %, about 65 wt. % to about 70 wt. %, about 75 wt. % to about 99 wt. %, about 85 wt. % to about 99 wt. %, and/or about 90 wt. % to about 99 wt. % based on the total weight of the colorant particle. The colorant particles typically have an average particle diameter of about 1 micron to about 50 microns, about 2 microns to about 25 microns, about 3 microns to about 15 microns, about 4 microns to about 12 microns, about 5 microns to about 10 microns, and/or about 7 microns to about 9 microns. The colorant particles typically are present in the ink composition in an amount of about 0.5 wt. % to about 50 wt. %, for example, about 1 wt. % to about 35 wt. %, about 5 wt. % to about 35 wt. %, and/or about 10 wt. % to about 30 wt. %.

Suitable dyes include, but are not limited to, aliphatic solvent-soluble dyes such as CI Acid Red 138, CI Solvent Red 135, CI Solvent Green 5, CI Solvent Green 20, CI Solvent Green 28, CI Solvent Blue 104, and CI Solvent Blue 97, alcohol-soluble dyes such as CI Acid Red 2, CI Solvent Red 43, CI Disperse Red 1, CI Disperse Red 19, CI Disperse Red 54, CI Disperse Green 9, CI Solvent Black 34, CI Solvent Blue 37, and CI Disperse Blue 148, and mixtures thereof.

The pigments for use in the ink compositions generally have a particle size about one-tenth the size of the polymer particles or less, for example, about one-twentieth, about one-fiftieth, about one-one hundredth, about one-five hundredth, and/or about one-one thousandth the size of the polymer particles. Typically, pigment particles have an average particle diameter of about 0.001 microns to about 5 microns, about 0.001 microns to about 1 microns, about 0.001 microns to about 0.5 microns, about 0.001 microns to about 0.3 microns, about 0.01 microns to about 0.5 microns, and/or about 0.2 microns to about 0.3 microns. Both exterior grade pigments and interior grade pigments are suitable.

Suitable pigments for white color include but are not limited to titanium dioxide pigments including rutile titanium dioxide pigments such as TIPURE® R-102, TIPURE® R-103, TIPURE® R-104, or TIPURE® R-105 (DuPont Company, Wilmington, Del.) and Kronos 2220 or 2233 (Kronos Inc, Houston, Tex.). Other pigments such as zinc oxide may also be used, either alone or in combination with the titanium dioxide. Suitable pigments for yellow, orange, red, violet, and blue colors include but are not limited to Pigment Yellow 81, Pigment Yellow 17, Pigment Yellow 155, Pigment Yellow 13, Pigment Yellow 139, Pigment Orange 13, Pigment Orange 34, Pigment Orange 38, Pigment Red 53:1, Pigment Red 38, Pigment Red 170, Pigment Red 48:3, Pigment Red 208, Pigment Red 262, Pigment Red 48:2, Pigment Red 185, Pigment Red 176, Pigment Red 57:1, Pigment Violet 15, Pigment Violet 19, Pigment Violet 23, Pigment Violet 29, Pigment Violet 32, Pigment Blue 15, Pigment Blue 15:1, Pigment Blue 15:2, Pigment Blue 15:3, Pigment Blue 27, Pigment Blue 1, Pigment Green 7, Pigment Green 8, Pigment Green 17, Pigment Green 18, Pigment Green 50, and Pigment Green 58, such as GRAPHTOL® Yellow H10G, GRAPHTOL® Yellow GG, GRAPHTOL® Yellow 3GP, GRAPHTOL® Yellow GR, GRAPHTOL® Yellow H2R, GRAPHTOL® Orange GPS, GRAPHTOL® Orange RL, GRAPHTOL® Red HFG, GRAPHTOL® Red LG, GRAPHTOL® Red LC, GRAPHTOL® Red BB, GRAPHTOL® Red F3RK 70, GRAPHTOL® Fire Red 3RLP, GRAPHTOL® Red HF2B, GRAPHTOL® Red F5RK, GRAPHTOL® Red 2BN, GRAPHTOL® Red P2B, GRAPHTOL® Carmine HF4C, GRAPHTOL® Carmine HF3C, GRAPHTOL® Rubine L4B, GRAPHTOL® Bordeaux HF3R, or GRAPHTOL® Blue AN (Clariant International Ltd, Muttenz, Switzerland); or SYNERGY™ Yellow 6207, SYNERGY™ Orange 6113, SYNERGY™ Yellow 6202 HG, SYNERGY™ Yellow 6205, SYNERGY™ Yellow 6210, SYNERGY™ Yellow 6223, SYNERGY™ Yellow 6298 L, SYNERGY™ Yellow FDA 6226, RIGHTFIT® Red K 3790, RIGHTFIT® Red K 4350, RIGHTFIT®, Yellow 1207, RIGHTFIT® Yellow 1226, RIGHTFIT® Yellow 1293, RIGHTFIT® Yellow 1296, RIGHTFIT® Yellow 1298, Rightfit® Yellow K 1994, HELIOGEN® Blue 7081 LB D D, HELIOGEN® Blue D 6700 T, HELIOGEN® Blue D 6840, HELIOGEN® Blue D 6925, HELIOGEN® Blue D 7079, HELIOGEN® Blue D 7086, HELIOGEN® Blue D 7088, HELIOGEN® Blue D 7092, HELIOGEN® Blue D 7095, HELIOGEN® Blue D 7110 F, HELIOGEN® Blue D 7490, HELIOGEN® Blue K 6850, HELIOGEN® Blue K 6902, HELIOGEN® Blue K 6903, HELIOGEN® Blue K 6907, HELIOGEN® Blue K 6911, HELIOGEN® Blue K 6912, HELIOGEN® Blue K 7090, HELIOGEN® Blue K 7096, or HELIOGEN® Blue K 7104 LW (BASF). Suitable pigments for black color include but are not limited to carbon black, such as BLACK PEARLS® carbon blacks (Cabot Corporation, Boston, Mass.) or RAVEN® BLACKS carbon blacks (Columbian Chemicals Company, Marietta, Ga.), and carbon nanotubes. Commercially available colorant particles comprising a pigment or a dye dispersed in a polymer matrix include white, black, red, blue, yellow and magenta RUBCOULEUR acrylic polymer colored beads (Dainichiseika Color & Chemical Mfg. Co. Ltd), white and black DECOSOFT® polyurethane colored particles (Microchem) and white and black DECOSILK® ART acrylic ester colored particles (Microchem). Additional suppliers of colored and polymer particles include Cospheric LLC, Phosphorex, Inc., Bangs Laboratories, Inc., J Color Chemicals, Kobo Products, Inc., and Sunjin Chemical Co.

Advantageously, adhesion between the pigment or dye and the polymer particles may be facilitated by selecting pigments and dyes that are compatible with the surface of the polymer particle (i.e., a pigment or dye that has similar surface properties and/or functionality as that of the polymer particle surface). For example, adhesion to a hydrophobic polymer particle surface may be facilitated by using hydrophobic pigments or dyes. Additionally, adhesion to a hydrophilic polymer particle surface may be facilitated by using hydrophilic pigments or dyes. Compatibility can also be facilitated by using surface-treated pigments.

The colorant particle can be a PMMA particle having an outer surface or a coating comprising titanium dioxide. The colorant particle can be a porous nylon particle having an outer surface or a coating comprising titanium dioxide.

The colorant particles can be prepared by known methods. One exemplary method for preparing colorant particles is particle-particle fusion. Particle-particle fusion uses mechanical force to fuse different particles (such as nanometer-sized particles with micron-sized particles), without the use of a binder, to provide solid-solid composite materials. The composite materials demonstrate improved performance, including improved chemical reactivity, flowability, heat resistance, and compatibility. Suitable devices for carrying out particle-particle fusion include the NOBILTA powder processing device (Hosokawa Micron) and the MECHANOFUSION AMS powder processing device (Hosokawa Micron).

Solvent(s)

A solvent is included in the ink compositions to dissolve the resin component and to provide a continuous phase vehicle for the dispersed colorant particles.

Suitable solvents include polar solvents (e.g., polar protic and polar aprotic solvents) and non-polar (i.e., hydrophobic solvents). The solvent generally is present in an amount of about 30 wt % to about 95 wt %, about 40 wt % to about 90 wt %, about 50 wt % to about 85 wt %, and/or about 55 wt % to about 75 wt %, based on the total weight of the ink composition.

In one aspect, the solvent comprises a polar protic solvent, for example, one or more alcohol solvents. Suitable alcohol solvents include one or more C1 to C15 alcohols, such as C2 to C10 alcohols, and/or C2 to C5 alcohols. The alcohol solvent can be a straight chain alcohol, a branched alcohol, a cyclic alcohol, or a mixture of the foregoing. Representative alcohol solvents include, but are not limited to, ethanol, propanol (e.g., isopropanol and/or n-propanol), butanol (e.g., isobutanol, sec-butanol, and/or n-butanol), pentanol (e.g., isopentanol and/or n-pentanol), hexanol, diacetone alcohol, and mixtures thereof. Other suitable protic solvents include monoalkylated polyethers such as dipropyleneglycol monoether and water.

In one aspect, the solvent comprises a polar aprotic solvent. Representative aprotic polar solvents include, but are not limited to, dimethylsulfoxide, dimethylacetamide, dimethylformamide, formamide, N-methyl pyrrolidinone, N-methyl morpholine, propylene carbonate, ethylene carbonate, acetonitrile, esters such as ethyl acetate, ketones such as methylisobutylketone (MIBK) and acetone, tetrahydrofuran, cyclohexanone, toluene, and mixtures thereof. Combinations of polar protic and polar aprotic solvents, including the polar protic and polar aprotic solvents specifically mentioned above, are also contemplated.

In one aspect, the solvent comprises a hydrophobic solvent. Representative hydrophobic solvents include, but are not limited to, aliphatic hydrocarbon solvents (e.g., heptane, methylcyclohexane, cyclohexane, and VM&P naphtha) and mixtures thereof.

Generally, the solvent is selected such that it does not substantially dissolve a dye present on the outer surface or in the coating of the polymer particle. For example, when the solvent is a polar solvent and the outer surface or coating comprises a dye, the dye typically is soluble in a hydrophobic solvent such as an aliphatic hydrocarbon solvent. Further, when the solvent is a hydrophobic solvent such as an aliphatic hydrocarbon solvent and the outer surface or coating comprises a dye, the dye typically is soluble in a polar solvent.

Marker Assemblies

The marker includes an ink reservoir disposed in a housing or barrel. The ink reservoir is in fluid communication with a porous nib. The barrel is typically sealed by a plug, which helps to keep the ink reservoir in place.

Typically, the ink reservoir and the nib are disposed in such a manner relative to each other that the ink composition can be transferred from the ink reservoir to the nib via migration as a result of the ink reservoir being in fluid communication with the nib. The ink composition generally moves by capillary-action within the reservoir, i.e., the ink composition generally moves by capillary-action from the distal end of the reservoir to the reservoir end which is proximate to the nib. Similarly, the ink composition generally moves within the nib by capillary-action, i.e., the ink composition generally moves by capillary-action from the portion of the nib which is proximate to the reservoir to the portion of the nib which is applied to a substrate to make a written mark. Loading and priming of the ink reservoirs and the nibs, respectively, can advantageously be carried out over a wide temperature range from about 0° F. to about 77° F.

According to a preferred embodiment, the ink reservoir is a wick-type reservoir, and the fibrous nib is in continuous (i.e., permanent) contact therewith. In one embodiment, the coupling zone provides a large surface area for the migration of an ink composition from the reservoir to the nib (relative to the size of the nib). The coupling zone on the reservoir is usually at least about the same, at least about 1.5 times greater than, and/or at least about 2 times greater than the corresponding greatest diameter of the nib.

Capillary-action markers useful for delivering ink compositions containing colorant particles comprise ink reservoirs having a relatively open structure. Suitable reservoirs for use in the markers according to the invention preferably have a reservoir fiber density less than about 0.50 g/cc, more preferably less than about 0.25 g/cc and most preferably less than about 0.10 g/cc.

The reservoir fibers can be manufactured from thermoplastic polymers such as, for example, polyesters, nylons, and mixtures thereof (provided that the fibers are insoluble in the ink composition). The fibers inside the reservoir can be linearly-oriented or entangled. To maintain the integrity of the ink reservoir, the reservoir may be wrapped with a sheet of polypropylene, high density polyethylene, or nylon. The reservoirs can be of any dimensions as long as the dimensions are sufficient for storing a predetermined amount of ink and for permitting the reservoir to fit into the desired marker body or housing.

The nibs should be sufficiently porous to allow the colorant particles to pass freely therethrough. The nib also should prevent ink compositions from leaking when the nib is downwardly disposed. Fibers of the nib should be compatible with (i.e., insoluble in) the ink composition solvent system and capable of retaining the ink composition. Suitable nib fibers can be manufactured from thermoplastic polymers such as, for example, polyesters, acrylics, nylons, and combinations thereof.

Methods of Preparing and Additives

An ink composition according to the invention can be prepared by standard methods. Generally, a colorant particle is dispersed in a solvent, the resin is dissolved in a solvent and additional solvent can be added to adjust the ink composition viscosity. A capillary-action marker containing the inventive ink composition can then be prepared according to standard processing methods.

The viscosity of the metallic ink composition at 25° C. is usually less than about 40 centipoises (cps), less than about 25 cps, and/or less than about 15 cps, for example, about 1 cps to about 40 cps, about 1 cps to about 25 cps, and/or about 1 cps to about 15 cps. However, the ranges provided above can shift higher or lower, depending on the nature and porosity of the nibs and the fiber density of the ink reservoirs used in the markers according to the disclosure.

The ink may optionally contain other additives such as, for example, surface tension modifier(s), other synergic resin(s), surfactant(s), non-volatile solvent(s), co-solvent(s), dispersing agent(s), humectants(s), rheological additive(s), biocide(s) and other additives known in the art. For example, suitable additives include pigment dispersants (e.g., EFKA dispersant (BASF), DISPERBYK dispersant (Byk Chemie), SOLSPERSE dispersant (Lubrizol)), wetting agents (e.g., BYK wetting agent (Byk Chemie), TEGO WET wetting agent (Evonik), DOW CORNING wetting agent (Dow Corning)), anti-settling agents (e.g., LAPONITE, GARAMITE, or CLAYTONE anti-settling agents (Southern Clay Products), BENTONE or REOLATE anti-settling agents (Elementis)), extender pigments, flow and leveling agents, cap-off agents, and other functional surfactants. These additives can be added to the ink compositions in an amount such that the overall performance of the ink compositions is not adversely affected in any aspect. Further, such additives can enhance ink stability, ink properties and/or ink performance. Additives, when present, typically are included in an amount of about 0.00001 wt. % to about 15 wt. %, for example, about 0.0001 wt. % to about 15 wt. %, about 0.001 wt. % to about 15 wt. %, about 0.01 wt. % to about 15 wt. %, about 0.1 wt. % to about 15 wt. %, about 1 wt. % to about 15 wt. %, about 2 wt. % to about 12 wt. %, about 3 wt. % to about 10 wt. %, about 4 wt. % to about 10 wt. %, and/or about 5 wt. % to about 10 wt. %, The ink compositions and writing instruments in accordance with the disclosure can be better understood in light of the following examples, which are merely intended to illustrate the markers and ink compositions and are not meant to limit the scope thereof in any way.

EXAMPLES

Example 1

Titanium dioxide-coated poly(methyl methacrylate) (PMMA) particles were prepared by particle-particle fusion using a NOBILTA 130 powder processing device (Hosokawa Micron).

Particles were prepared by mixing 260 g SPHEREOMERS CA SOLID PMMA beads with 60 g TiPure R-105. The mixture was loaded into a NOBILTA 130 powder processing device and the mixture was processed for 15 to 30 minutes with the motor load at 5 kw. The resulting product was used directly without further processing.

An ink composition was prepared with the ingredients identified in Table 1 in the amounts shown.

TABLE 1

| Component | Function | Wt. % |
| --- | --- | --- |
| FILTREZ 530S (Lawter) | Fumaric Modified Rosin Resin | 10 |
| Ethanol/n-Butanol blend (12:1 wt./wt.) | Solvent | 69 |
| S-MAZ 60 (BASF) | Sorbitan Fatty Acid Ester Surfactant | 1 |
| TIPURE R-105 (DuPont) coated PMMA particles | Colorant Particles (Titanium Dioxide-Coated Solid PMMA Particles) | 20 |

The resin was dissolved in the alcohol blend and the surfactant was added. The mixture was heated until the surfactant dissolved. The coated particles were dispersed in the resin/surfactant mixture, and mixing was continued at medium to high speed for three minutes. The ink composition was loaded into a marker equipped with an ink reservoir and a porous nib. White traces containing moderate densities of titanium dioxide-coated particles were produced when a marker containing the ink composition was used to make written marks on black paper, both shortly after initial preparation of the marker and after storage of the marker overnight at room temperature with the marker tip in a downward position.

Example 2

Titanium dioxide-coated nylon particles were prepared by mixing 130 g ORGASOL 2001UD NAT1 porous nylon particles 39 g TiPure R-103. The mixture was loaded into a NOBILTA 130 powder processing device and was processed for 15 to 30 minutes with the power load at about 5 kw. The resulting colored particles having 23.1 wt. % $TiO_2$ were used directly without further processing.

An ink composition was prepared with the ingredients identified in Table 2 in the amounts shown.

TABLE 2

| Component | Function | Wt. % |
|---|---|---|
| JONCRYL 682 (BASF) | Styrene Acrylic Resin | 10 |
| S-MAZ 60 (BASF) | Sorbitan Fatty Acid Ester Surfactant | 1 |
| n-Propanol/Diacetone Alcohol blend (14:1 wt./wt.) | Solvent | 69 |
| TIPURE R-103 (DuPont) coated porous nylon particles | Colorant Particles (Titanium Dioxide-Coated Porous Nylon Particles) | 20 |

The resin was dissolved in the alcohol blend. The coated particles were dispersed in the resin mixture, and mixing was continued at medium to high speed for three minutes. The ink composition was loaded into a marker equipped with an ink reservoir and a porous nib. White traces containing high densities of titanium dioxide-coated particles were produced when a marker containing the ink composition was used to make written marks on black paper, both shortly after initial preparation of the marker and after storage of the marker overnight at room temperature with the marker tip in a downward position.

Example 3

Titanium dioxide-coated nylon particles were prepared by mixing 500 g ORGASOL 2001UD NAT1 porous nylon particles with 150 g TiPure R-103. The mixture was loaded into an AMS-Lab powder processing device and was processed for 20 to 40 minutes with the motor load at about 0.6 kw. The resulting product was used directly without further processing.

An ink composition was prepared with the ingredients identified in Table 3 in the amounts shown.

TABLE 3

| Component | Function | Wt. % |
|---|---|---|
| SYLVARES TP 7042 (Arizona Chemicals) | Terpene Phenolic Resin | 10 |
| VM & P naphtha | Solvent | 70 |
| TIPURE R-103 (DuPont) coated porous nylon particles | Colorant Particles (Titanium Dioxide-Coated Porous Nylon Particles) | 20 |

The resin was dissolved in the aliphatic hydrocarbon solvent. The coated particles were dispersed in the resin mixture, and mixing was continued at medium to high speed for three minutes. The ink composition was loaded into a marker equipped with an ink reservoir and a porous nib. White traces containing high densities of titanium dioxide-coated particles were produced when a marker containing the ink composition was used to make written marks on black paper, both shortly after initial preparation of the marker and after storage of the marker overnight at room temperature with the marker tip in a downward position.

Example 4

An ink containing titanium dioxide-coated nylon particles was compared to inks containing titanium dioxide pigment alone and to an ink containing a blend of titanium dioxide pigment with uncoated nylon particles.

Titanium dioxide-coated nylon particles were prepared by mixing 130 g ORGASOL 2001UD NAT1 porous nylon particles with 39 g TiPure R-103. The mixture was loaded into a Nobilta 130 powder processing device and was processed for 15 to 30 minutes with the motor load at about 5 kw. The resulting colored particles with 23.1 wt. % $TiO_2$ were used directly without further processing.

Ink compositions were prepared with the ingredients identified in Table 4 in the amounts shown.

TABLE 4

| Component | Function | A (wt. %) | B (wt. %) | C (wt. %) | D (wt. %) |
|---|---|---|---|---|---|
| FLEX-REZ 1155AS (Lawter) | Polyamide Resin | 12 | 12 | 14.2 | 12 |
| n-Propanol | Solvent | 60 | 60 | 70.9 | 60 |
| Diacetone Alcohol | Solvent | 5 | 5 | 5.9 | 5 |
| S-MAZ 60 (BASF) | Sorbitan Fatty Acid Ester Surfactant | 1 | 1 | 1.2 | 1 |
| DIPERSBYK 2150 (Byk Chemie) | Dispersant | 2 | 2 | 2.4 | 2 |
| TIPURE R-103 (DuPont) coated porous nylon particles | Colorant Particles (Titanium Dioxide-Coated Porous | 20 | — | — | — |

TABLE 4-continued

| Component | Function | A (wt. %) | B (wt. %) | C (wt. %) | D (wt. %) |
|---|---|---|---|---|---|
| | Particles, 23% wt. % $TiO_2$) | | | | |
| $TiO_2$ Pigment | White Pigment | — | 20 | 5.4 | 4.6 |
| ORGASOL 2001UD NAT1 | Uncoated Porous Nylon Particles | — | — | — | 15.4 |
| Total (wt. %) | | 100 | 100 | 100 | 100 |
| Total $TiO_2$ (wt. %) | | 4.6 | 20 | 5.4 | 4.6 |
| Initial marker ink trace ranking[1] | | 5 (no/little observed colorant particle penetration into paper) | 2 ($TiO_2$ penetrated into paper) | 1 ($TiO_2$ penetrated into paper) | 3 ($TiO_2$ penetrated into paper) |
| Marker ink trace ranking after 24 hours/overnight | | 5 (colorant particle settled in nib; no/little observed colorant particle penetration into paper) | 4 ($TiO_2$ settled in nib; $TiO_2$ penetrated into paper) | 1 ($TiO_2$ penetrated into paper) | 2 ($TiO_2$ and polymer particle settled in nib; TiO2 penetrated into paper) |
| Marker ink trace ranking after 72 hours | | 5 (colorant particle settled in nib; no/little observed colorant particle penetration into paper) | 1 (settled $TiO_2$ clogged nib) | 1 ($TiO_2$ settled in nib; $TiO_2$ penetrated into paper) | 1 ($TiO_2$ settled in nib; TiO2 penetrated into paper) |

[1]The marker ink trace ranking is based on a scale of 1 to 5, in which a ranking of 1 represents a poor performing marker and a ranking of 5 represents a high performing marker.

The markers were stored in a tip-down position at room temperature. Marker performance was tested by making written marks on porous black paper. The markers were tested at an initial time point (after allowing two hours for priming of the nib), at approximately 24 hours, and at approximately 72 hours. Line/color intensity of the marker was observed and rated on a visual scale of 1 to 5, in which a ranking of 1 means a poor performing marker (i.e., the line was almost invisible) and a ranking of 5 represented a high performing marker (i.e., the line was bright and opaque). Marker formulation A, which contained titanium dioxide-coated particles in accordance with the invention, consistently demonstrated a high level of performance at each of the time points tested. Comparative formulations B, C, and D did not achieve the high level of performance of formulation A. While not intending to be bound by any particular theory, the poor performances of formulations B, C, and D are believed to be due to settling/clogging of $TiO_2$ in the nib and/or penetration of $TiO_2$ into the porous paper, as shown in Table 4. It is believed that the presence of polymer particles in formulation D contributes to the initially reduced penetration of $TiO_2$ into the porous paper demonstrated by this formulation, but the 72 hour performance demonstrates this is only a temporary effect.

The unacceptable performance of marker formulations B and C showed that replacing $TiO_2$ pigment with a $TiO_2$-coated polymer particle significantly improved marker performance. Surprisingly, this effect was observed not only when a relatively high amount (i.e., 20 wt. %, see formulation B) of $TiO_2$ pigment was used, but also when a relatively low amount of $TiO_2$ pigment (i.e., 5.4 wt. %, see formulation C) was used. The overall weight percentage of $TiO_2$ present in formulation A was 4.6 wt. %, which is similar to the 5.4 wt. % of $TiO_2$ present in formulation C. Thus, the performance of a marker containing a $TiO_2$-coated particle in accordance with the invention (see formulation A) was significantly improved compared to a marker containing a similar weight percentage of $TiO_2$ pigment in the absence of a polymer particle (see formulation C). Further, the performance of a marker containing a $TiO_2$-coated particle in accordance with the invention (see formulation A) was significantly improved as compared to a marker containing a similar weight percentage of $TiO_2$ pigment blended with a polymer particle (formulation D).

Example 5

Red pigment-coated nylon particles were prepared by mixing 130 g ORGASOL 2001UD NAT 2 porous nylon particles with 39 g Red D3G-70EDS (Clariant). The mixture was loaded into a Nobilta 130 powder processing device and the mixture was processed for 15 to 30 minutes with the motor load at about 5 kw. The resulting colorant particles having 23.1 wt. % red pigment were used directly without further processing.

Ink compositions were prepared with the ingredients identified in Table 5 in the amounts shown.

TABLE 5

| Component | Function | Wt. % |
|---|---|---|
| FLEX-REZ 1155AS (Lawter) | Polyamide Resin | 12 |
| n-Propanol | Solvent | 60 |
| Diacetone Alcohol | Solvent | 5 |
| S-MAZ 60 (BASF) | Sorbitan Fatty Acid Ester Surfactant | 1 |
| DIPERSBYK 2150 (BYK) | Dispersant | 2 |
| Red D3G-70EDS (Clariant) coated porous nylon particles | Colorant Particles (Red Pigment-Coated Porous Nylon Particles, 23.1 wt. % red organic pigment) | 20 |

Marker performance was tested by making written marks on porous white paper and porous black paper. Bright, red lines were clearly visible on both white and black paper.

The performance of a marker comprising an ink composition containing red pigment-coated polymer particles was compared to a commercially available SHARPIE® marker containing a red dye-based permanent marker ink. The red-dye based ink did not include polymer particles. When the marker containing a red dye-based ink was used to make written marks on porous white paper and porous black paper, bright, red lines were visible on the white paper and were almost invisible on the black paper. The performance of the red dye-based ink on porous black paper showed that replacing a red dye with a red pigment-coated particle according to the invention significantly improved marker performance on porous black paper.

What is claimed is:

1. An ink composition comprising:
   (a) a solvent;
   (b) a colorant particle dispersed in the solvent; and
   (c) a resin component dissolved in the solvent,
wherein the colorant particle comprises a polymer particle having an outer surface or a coating comprising a pigment or a dye, and the viscosity of the ink composition at 25° C. is less than about 40 centipoises (cps).

2. The ink composition of claim 1, wherein the colorant particle comprises solid polymer particles.

3. The ink composition of claim 1, wherein the colorant particle comprises porous polymer particles selected from the group consisting of totally porous particles (TPP), superficially porous particles (SPP), and mixtures thereof.

4. The ink composition of claim 1, wherein the colorant particle comprises hollow polymer particles selected from the group consisting of porous shell particles, solid shell particles, and mixtures thereof.

5. The ink composition of claim 1, wherein the colorant particle comprises a polymer-pigment conjugate or a polymer-dye conjugate.

6. The ink composition of claim 1, wherein the colorant particle comprises a pigment or a dye dispersed in a polymer matrix.

7. The ink composition of claim 1, wherein the outer surface or coating comprises a pigment selected from the group consisting of titanium dioxide, Pigment Yellow 81, Pigment Yellow 17, Pigment Yellow 155, Pigment Yellow 13, Pigment Yellow 139, Pigment Orange 13, Pigment Orange 34, Pigment Orange 38, Pigment Red 53:1, Pigment Red 38, Pigment Red 170, Pigment Red 48:3, Pigment Red 208, Pigment Red 262, Pigment Red 48:2, Pigment Red 185, Pigment Red 176, Pigment Red 57:1, Pigment Violet 15, Pigment Violet 19, Pigment Violet 23, Pigment Violet 29, Pigment Violet 32, Pigment Blue 15, Pigment Blue 15:1, Pigment Blue 15:2, Pigment Blue 15:3, Pigment Blue 27, Pigment Blue 1, Pigment Green 7, Pigment Green 8, Pigment Green 17, Pigment Green 18, Pigment Green 50, Pigment Green 58, carbon black, carbon nanotubes, and mixtures thereof.

8. The ink composition of claim 1, wherein the solvent is a polar solvent and the outer surface or coating comprises a dye that is soluble in a hydrophobic solvent such as an aliphatic hydrocarbon solvent.

9. The ink composition of claim 1, wherein the solvent is a hydrophobic solvent and the outer surface or coating comprises a dye that is soluble in a polar solvent.

10. The ink composition of claim 1, wherein the outer surface or coating comprises a dye selected from the group consisting of aliphatic solvent-soluble dyes, CI Acid Red 138, CI Solvent Red 135, CI Solvent Green 5, CI Solvent Green 20, CI Solvent Green 28, CI Solvent Blue 104, CI Solvent Blue 97, alcohol-soluble dyes, CI Acid Red 2, CI Solvent Red 43, CI Disperse Red 1, CI Disperse Red 19, CI Disperse Red 54, CI Disperse Green 9, CI Solvent Black 34, CI Solvent Blue 37, CI Disperse Blue 148, and mixtures thereof.

11. The ink composition of claim 1, wherein the colorant particles have an average particle diameter of about 1 micron to about 50 microns.

12. The ink composition of claim 1, wherein the polymer particles do not substantially increase in size when contacted with the solvent.

13. The ink composition of claim 1, wherein the polymer particles do not substantially decrease in size when contacted with the solvent.

14. The ink composition of claim 1, wherein the polymer particle comprises a polymer selected from the group consisting of acrylic polymers, acrylic copolymers, poly(methyl methacrylate) (PMMA), polyamides, nylons, and alginates.

15. The ink composition of claim 1, wherein the polymer particle comprises a crosslinked polymer.

16. The ink composition of claim 1, wherein the polymer particle comprises a non-crosslinked polymer or a thermoplastic polymer.

17. The ink composition of claim 1, wherein the solvent is an alcohol solvent.

18. The ink composition of claim 1, wherein the solvent comprises one or more C1 to C15 alcohols.

19. The ink composition of claim 1, wherein the resin is selected from the group consisting of alcohol-soluble polymers or resins, aliphatic hydrocarbon solvent-soluble polymers or resins, polyamide resins, acrylic resins, acrylic copolymers, rosin resins, modified rosin resins, polymerized rosin resins, phenolic resins, terpene phenolic resins, water-based film-forming polymers, latexes, acrylic latexes, and styrenated acrylic latexes.

20. The ink composition of claim 1, wherein the colorant particle comprises a porous nylon particle having an outer surface or a coating comprising titanium dioxide.

21. A marker comprising:
   an ink reservoir and a porous nib,
   the ink reservoir containing an ink composition according to claim 1.

22. A method of making a written mark, comprising:
   providing a capillary-action marker comprised of an ink reservoir and a porous nib, the ink reservoir containing an ink composition according to claim 1; and
   contacting the nib of the capillary-action marker to a substrate surface to make a written mark.

* * * * *